US007345460B2

(12) United States Patent
Ma et al.

(10) Patent No.: US 7,345,460 B2
(45) Date of Patent: Mar. 18, 2008

(54) THERMAL COMPENSATION METHOD FOR CMOS DIGITAL-INTEGRATED CIRCUITS USING TEMPERATURE-ADAPTIVE DIGITAL DC/DC CONVERTER

(75) Inventors: Dongsheng Ma, Tucson, AZ (US); Chuang Zhang, Plano, TX (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 5 days.

(21) Appl. No.: 11/361,233

(22) Filed: Feb. 24, 2006

(65) Prior Publication Data
US 2006/0193157 A1    Aug. 31, 2006

Related U.S. Application Data

(60) Provisional application No. 60/657,342, filed on Feb. 28, 2005.

(51) Int. Cl.
*G05F 1/40* (2006.01)
(52) U.S. Cl. ..................... 323/283; 323/907
(58) Field of Classification Search ............... 323/224, 323/907, 283, 288, 282, 284
See application file for complete search history.

(56) References Cited

U.S. PATENT DOCUMENTS

| | | | | |
|---|---|---|---|---|
| 6,396,250 | B1 * | 5/2002 | Bridge | 323/283 |
| 6,958,592 | B2 * | 10/2005 | Chapuis | 323/284 |
| 7,098,640 | B2 * | 8/2006 | Brown | 323/283 |
| 7,148,667 | B2 * | 12/2006 | Umemoto et al. | 323/282 |
| 7,249,267 | B2 * | 7/2007 | Chapuis | 323/283 |
| 2003/0038614 | A1 | 2/2003 | Walters et al. | 323/282 |

OTHER PUBLICATIONS

Achenbach, R. et al., "A Digitally Temperature-Compensated Crystal Oscillator," IEEE Journal of Solid State Circuits, vol. 35, pp. 1502-1507 (2000).
Johns, D.A. et al., Analog Integrated Circuit Design (John Wiley & Sons, Inc., New York, 1997).
Rabaey, J.M. et al., Integrated Circuits—A Design Perspective, 2nd Edition (Prentice Hall, New Jersey, 2003); P. Allen, et al., CMOS Analog Circuit Design (Oxford University Press, New York, 2002).
Zhang, C. et al., "Thermal compensation method for CMOS digital integrated circuits using temperature-adaptive DC/DC converter," (preprint, submitted to IEEE Trans. on Circuits & Systems II, on Jul. 1, 2005).

* cited by examiner

*Primary Examiner*—Jessica Han
(74) *Attorney, Agent, or Firm*—John H. Runnels; Bonnie J. Davis; James C. Carver

(57) ABSTRACT

A device and method of providing thermal compensation for integrated circuits, e.g., complementary metal-oxide semiconductor integrated circuits ("IC") is described. The device is an IC (e.g., digital, analog, and mixed-signal circuits) with a digital voltage control system ("VCS") having a temperature-adaptive digital DC-to-DC power converter. In one embodiment, the DC-to-DC converter includes a power stage, which converts a voltage of an input power source to a variable supply voltage, a delay-line-based temperature sensing circuit that continuously monitors temperature changes, and adjusts the frequency and process speed of the IC to compensate for any performance degradation caused by thermal effects by adjusting the voltage supplied to the IC to increase or decrease the frequency and process speed of the IC in proportion to any abnormal temperature changes in the IC.

26 Claims, 8 Drawing Sheets

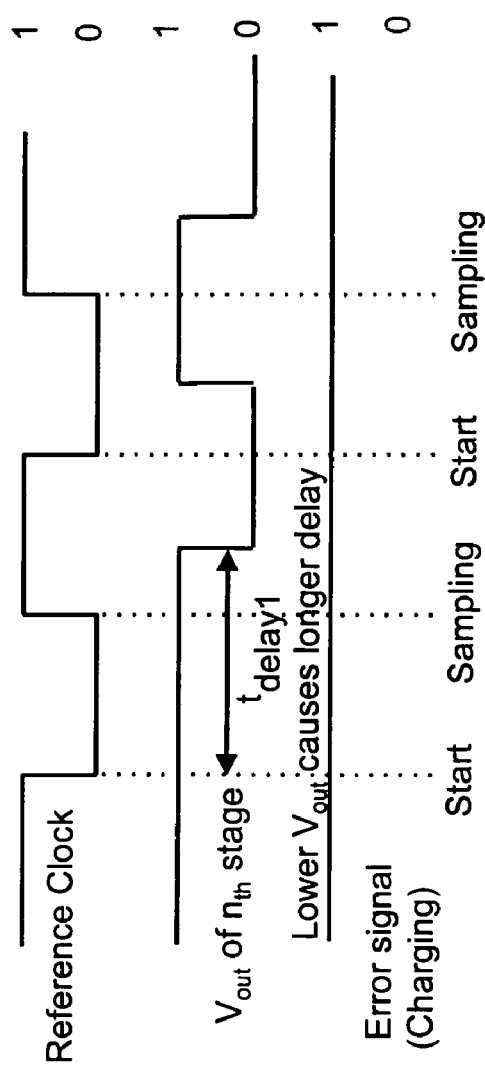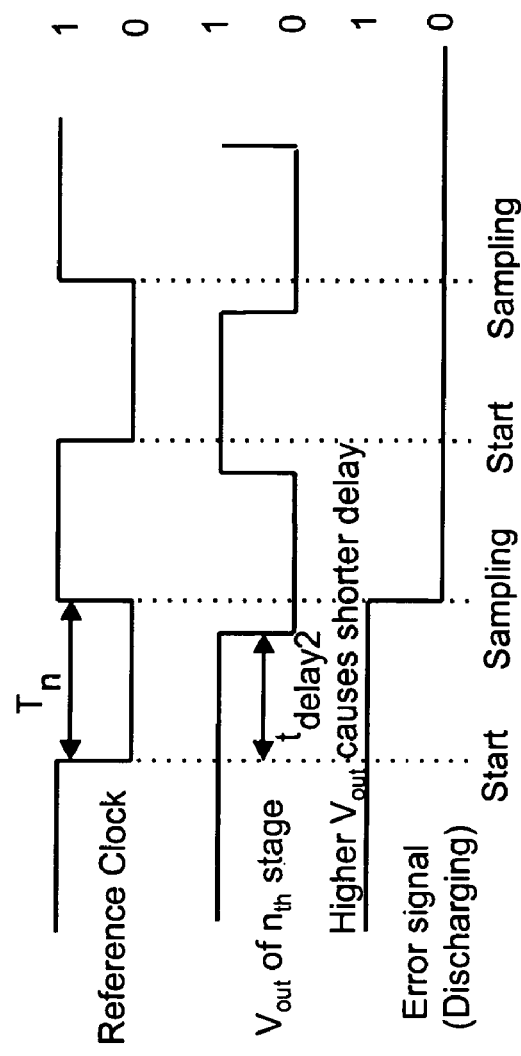

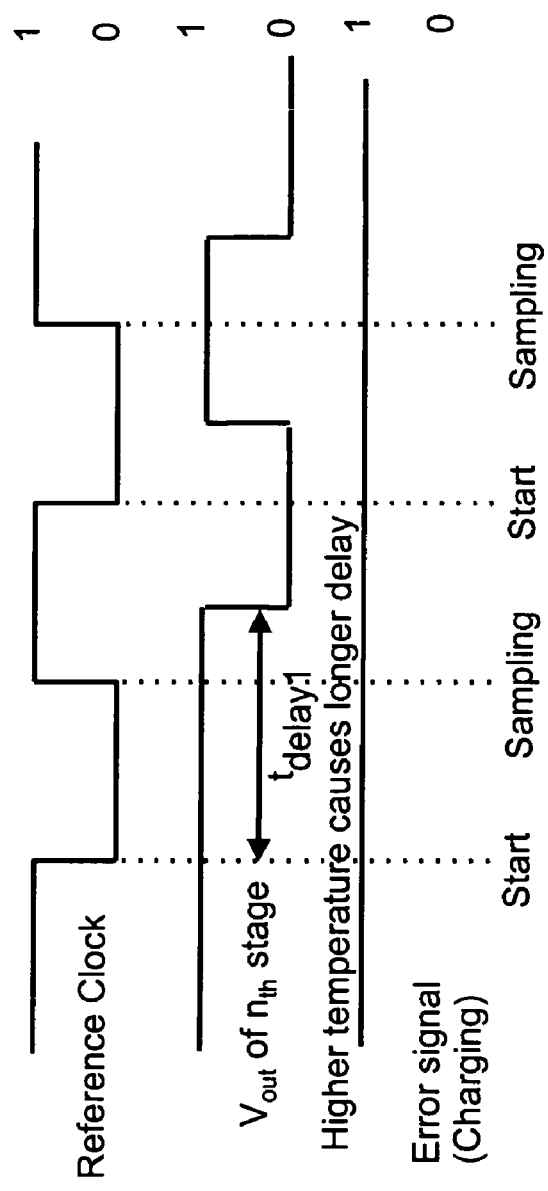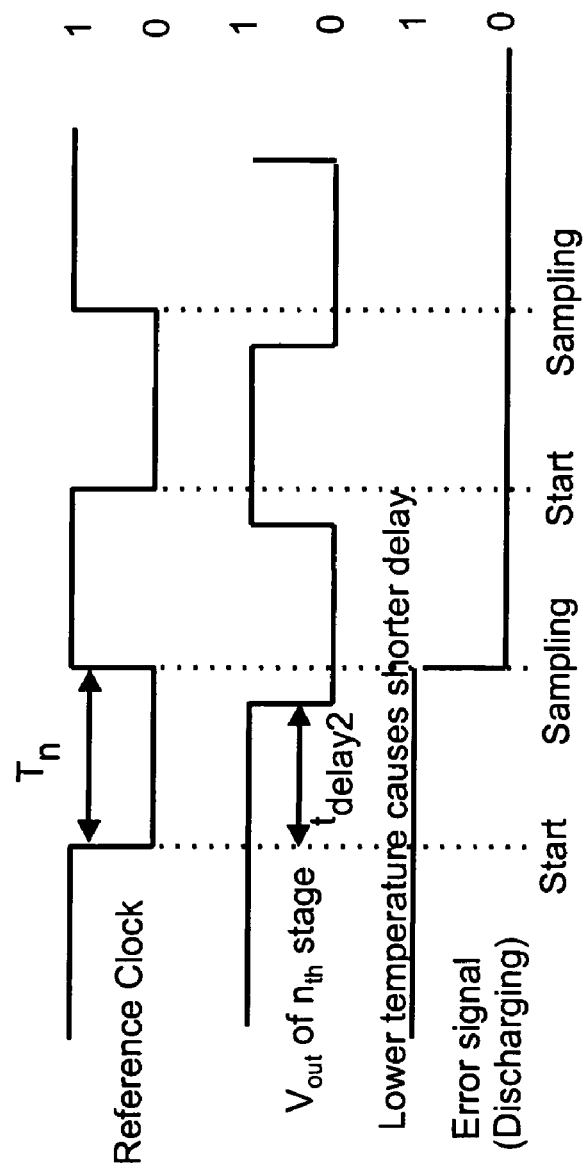

THERMAL COMPENSATION METHOD FOR CMOS DIGITAL-INTEGRATED CIRCUITS USING TEMPERATURE-ADAPTIVE DIGITAL DC/DC CONVERTER

This invention pertains to a simple, inexpensive device and method of enhancing the reliability and performance of integrated circuits, e.g., complementary metal-oxide semiconductor ("CMOS") integrated circuits ("ICs"), in one or more of the following ways: by minimizing performance degradation (e.g., frequency and process speed) of circuits caused by abnormal temperature variations in the circuit; by minimizing processing errors and operating failures; and by minimizing space used to integrate on-chip temperature compensation devices.

Thermal-compensation for performance degradation (e.g., frequency and process speed) in integrated circuits (e.g., digital, analog, and mixed-signal circuits) caused by thermal effects has become a dominant aspect of semiconductor chip design. The performance level in high performance circuits such as a metal-oxide-semiconductor ("MOS") integrated circuit ("IC") depends on both the mobility (i.e., the average particle drift velocity per unit electric field) and the threshold voltages of the transistors used in the circuit. The importance of compensating for performance degradation in ICs is indicated by the fact that high performance circuit designs (e.g., MOS IC circuits) represent more than 99 percent of the digital IC market due to low power consumption and low fabrication costs.

A major disadvantage with MOS ICs such as ring oscillators is that both the mobility and the threshold voltages of the transistors used in the circuit vary with temperature changes, which may alter the drain current supplied to the circuit to operate its gates causing functional delays. Large variations (e.g., >5 percent) in the drain current may cause signal processing errors and operating failures. In ring oscillators, thermal effects may cause serious problems because the frequency of the oscillator usually drifts as the temperature changes. An unstable frequency in a ring oscillator may increase jitter (i.e., the result of an effective sampling time changing from one sampling instance to another). Ideally, the spacing between transitions in an oscillator should be constant; however, in practice, the transition spacing typically varies, causing sampling uncertainty, which is also referred to as "clock jitter," or "phase noise." For example, when high-speed signals are sampled, the input signal changes rapidly, resulting in small amounts of aperture uncertainty, which causes the held-voltage to differ from the ideal held-voltage. J. M. Rabaey, et al., Integrated Circuits—A Design Perspective, 2nd Edition (Prentice Hall, N.J., 2003); P. Allen, et al., CMOS Analog Circuit Design (Oxford University Press, New York, 2002).

R. Achenbach, et al, "A Digitally Temperature-Compensated Crystal Oscillator," *IEEE Journal of Solid State Circuits*, Vol. 35, pp. 1502-1507 (2000) discloses a device and method of minimizing performance degradation (e.g., frequency and process speed) in integrated circuits by measuring temperature variations in the integrated circuit ("IC") using a temperature sensor that outputs an analog signal, converting the analog signal to a digital signal using an analog-to-digital signal converter, and then adjusting the frequency and process speed of the IC to compensate for any performance degradation caused by thermal effects by converting the digital signal to an analogous voltage/current signal that adjusts the voltage supplied to the IC in proportion to the temperature changes in the IC using a digital-to-analog converter. A major disadvantage with this method is that it requires complex circuits such as high resolution, analog-to-digital and digital-to-analog converters, which require excessive space to integrate on-chip temperature compensation. Another major disadvantage with this method is that high resolution, analog-to-digital and digital-to-analog converters are sensitive to noise, and thus are prone to processing errors and operating failures. See D. A. Johns, et. al., Analog Integrated Circuit Design (John Wiley & Sons, Inc., New York, 1997); and United States Patent Publication No. 2003/0038614.

An unfilled need exists for a device and method of enhancing the reliability and performance of integrated circuits, in one or more of the following ways: by minimizing performance degradation (e.g., frequency and process speed) of circuits caused by abnormal temperature variations in the circuit; by minimizing processing errors and operating failures; and by minimizing space used to integrate on-chip temperature compensation devices.

We have discovered a simple, inexpensive device and method of enhancing the reliability and performance of integrated circuits, e.g., complementary metal-oxide semiconductor ("CMOS") integrated circuits ("ICs"), in one or more of the following ways: by minimizing the performance degradation of circuits (e.g., frequency and process speed) caused by abnormal temperature variations in the circuit; by minimizing processing errors and operating failures; and by minimizing available chip space used to integrate on-chip temperature compensation devices. The device is an IC (e.g., digital, analog, and mixed-signal circuits) comprising a digital voltage control system ("VCS") having a temperature-adaptive digital DC-to-DC voltage converter. In one embodiment, the DC-to-DC converter comprises a delay-line-based temperature sensing circuit that continuously monitors temperature changes, and adjusts the frequency and process speed of the IC to compensate for any performance degradation caused by thermal effects by adjusting the voltage supplied to the IC (i.e., $V_{out}$) to increase or decrease the frequency and process speed of the IC in proportion to any abnormal temperature changes in the IC.

DETAILED DESCRIPTION OF THE DRAWINGS

FIG. 2 is a graph plotting the operational timing of one embodiment of the delay line-based temperature adaptive DC-to-DC converter as a function of velocity.

FIG. 3 is a graph plotting the operational timing of one embodiment of the delay line-based temperature adaptive DC-to-DC converter as a function of temperature.

Figure 1:
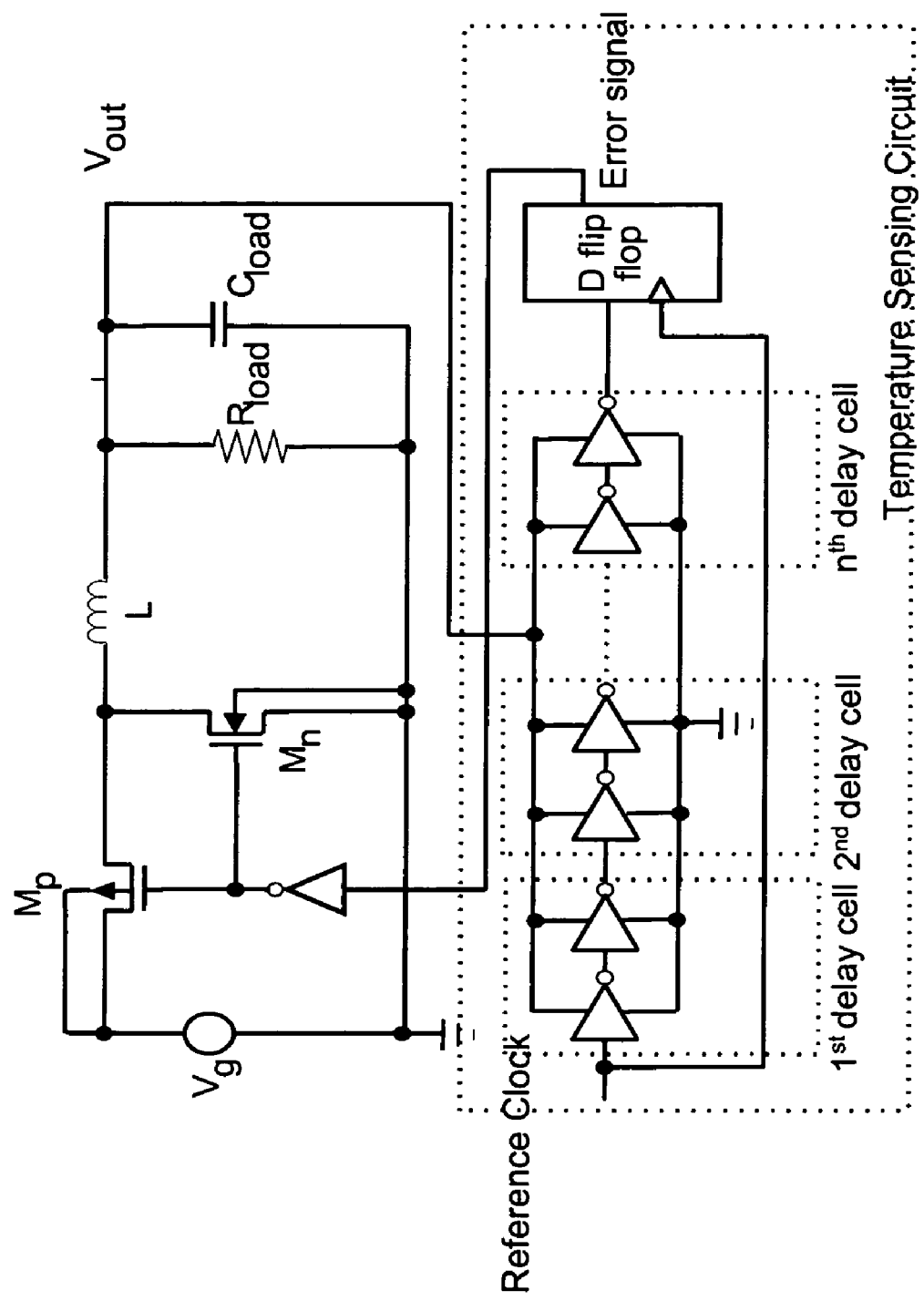
FIG. 1 is a block diagram of one embodiment of the delay line-based temperature adaptive DC-to-DC converter.

This invention provides a reliable, inexpensive device and method for adjusting the frequency and process speed of an IC (e.g., digital, analog, and mixed-signal circuits) to compensate for any performance degradation caused by abnormal temperature changes/thermal effects. The invention may be used to improve the reliability and performance of CMOS ICs, including mixed-signal, analog, and digital circuits. The basic design of the device is that of a conventional CMOS IC. In a preferred embodiment, to enhance the reliability and performance of the CMOS IC, the basic design further comprises at least one digital VCS. The VCS is a circuit comprising a temperature-adaptive digital DC-to-DC voltage converter having a delay line-based temperature sensing circuit that monitors temperature changes in the IC, and adjusts the frequency and speed of the IC to compensate for any performance degradation caused by abnormal temperature changes in the chip, while minimizing space used to integrate on-chip thermal-compensation. The frequency and speed of the IC is adjusted by varying the voltage ("$V_{out}$") supplied to the IC as will be more fully described below.

In one embodiment, the delay-line-based temperature sensing circuit continuously measures and detects abnormal temperature variations in the IC. If an abnormally low temperature is detected (i.e., a temperature below the design specification of the IC, which decreases the speed of a circuit to level at which the circuit cannot properly process and respond to a signal within a desired time), the delay-line-based temperature sensing circuit signals the VCS to increase the speed and frequency of the IC by increasing the $V_{out}$. If an abnormally high temperature (i.e., a temperature exceeding the design specification of the IC, which increases the speed of the IC to a level at which the circuit cannot properly process and respond to signals within a desired time) is detected, the delay-line-based temperature sensing circuit signals the VCS to decrease the speed and frequency of the IC by decreasing the $V_{out}$.

There are several advantages to using this device to compensate for performance losses in ICs. First, the number of components may be minimal. Fabrication may be simple and inexpensive. Second, the device compensates for thermal effects, which cause performance losses in digital circuits by adjusting the voltage supplied to the circuit. Third, the device may be used to compensate for performance losses in any digital circuit (e.g., microprocessors, input/output interfaces, digital sensors, and mixing signal chips). Fourth, the delay-line based controller allows for low power consumption (<100 μW). Fifth, the DC-to-DC converter provides a variable output voltage ideally ranging between the ground and the input supply voltage. Ripple voltage (i.e., the magnitude of small signal variation at the regulated output voltage of a DC-to-DC converter) is controlled in a very small range (e.g. within 25 mV). Sixth, the use of a CMOS delay line reduces the spacing required for integrating on-chip temperature compensation circuitry. For example, with a standard 1.5 μm double-poly, double-metal CMOS N-well process, the active die area of one prototype chip is 0.95 mm².

EXAMPLE 1

FIG. 1 is a circuit level diagram of one embodiment of the digital voltage control system having a delay-line based temperature adaptive DC-to-DC converter in accordance with the present invention. The DC-to-DC converter comprises a power stage, a delay-line-based digital controller ("delay-line") which functions as both a temperature sensing circuit and a pulse-width modulator for generating control signals and determining the duty ratios of the transistors in the power stage, a clock generator for producing a reference clock signal, a D flip-flop for producing an error signal, and an output voltage ("$V_{out}$"). To facilitate the compensation of any performance degradation caused by thermal effects, the delay-line was connected to $V_{out}$ to detect any abnormal voltage changes in the IC caused by thermal effects. If the operating temperature of the IC was outside of its normal range, the delay line detected the change in temperature and responded by adjusting the propagation delay created by the delay line. The propagation delay was then compared to a reference clock to produce an error signal (i.e. the difference in time between the delay time and the reference clock), which was detected by the D flip-flop. The traveling time of the reference clock (i.e., the time it takes for a signal to travel from a first to an $n^{th}$ delay cell) was determined by the propagation delay total. If the temperature of the IC was less than the normal operating temperature, the propagation delay increased, and the D flip-flop detected a value '1' and responded by switching on a power transistor $M_p$ to increase $V_{out}$ by allowing an inductor, L, to be charged (i.e., the electronic charge stored in the inductor increases). The frequency and process speed of the IC increased as $V_{out}$ increased. If the temperature of the IC exceeded the normal operating temperature of the IC, the propagation delay decreased, and the D flip-flop detected a value '0' and responded by switching on a power transistor $M_n$ to decrease $V_{out}$ by allowing a capacitor, $C_{load}$, to charge.

The sensitivity level of the delay-line depended on the number of delay cells ($n^{th}$) and the $T_{total}$ of the delay-line. In general, the resolution of $V_{out}$ increases as the number of delay cells increases. However, implementation of more delay cells requires a larger chip area. In this embodiment, twenty delay cells were selected to optimize both the chip area and resolution of $V_{out}$, based on a 1.5 μm CMOS processor, which achieved a $V_{out}$ resolution of 25 mV. The propagation delay total (i.e., the time required for a digital signal to travel from the inputs of a logic gate to the outputs) of the delay-line-based digital controller was the product of the total number of delay cells (each delay cell is composed with two inverters), and is expressed as $$T_{total} = 2nt_d = \frac{2nKV_{supply}}{\mu(V_{supply} - V_T)^2} \quad (1)$$

where $t_d$ is the propagation delay of each inverter stage; $V_T$ is the threshold voltage; n is the number of delay cells (each delay cell comprises two inverters) in the $T_{total}$; K is a constant parameter for a given MOS field effect transistor ("MOSFET"); and μ is the equivalent mobility of the, MOSFET. Here, μ and $V_T$ are temperature dependent, and thus may be approximated using Eqs. (2) and (3), respectively. See S. M. Sze, Physics of Semiconductor Devices, 2$^{nd}$ Edition (New York, Wiley, 1973) and R. A Blauschild, et al., "A New Temperature-Stable Voltage Reference," IEEE J. of *Solid-State Circuits*, vol. SC-19, no. 6, pp. 767-774 (1978).

$$\mu = K_\mu T^{-1.5} \quad (2)$$

$$V_T(T) = V_T(T_0) - \alpha(T - T_0) \quad (3)$$

where T is the operating temperature of the device, measured in Kevin; $T_0$ is room temperature or 300 K; and α is a constant value which is determined by the substrate doping level and the implant dose during fabrication. In Eqs. (2) and (3), the mobility μ has a negative temperature dependence, while the threshold voltage $V_T$ has a positive temperature dependence. As shown in FIG. 1, the delay-line-based digital controller is powered by $V_{out}$ of the DC-to-DC converter, which equals $V_{supply}$. Eqs. 1-3 may be combined to produce the following equation:

$$T_{total} = \frac{2nK}{K_\mu} \frac{V_{out} T^{\frac{3}{2}}}{(V_{out} - \alpha T - V_T(T_0) + \alpha T_0)^2} \quad (4)$$

Accordingly, a constant $T_{total}$ may be maintained for temperature variation by determining $V_{out}$.

By Taking $$\frac{\partial t_{total}}{\partial T} = 0,$$

we have $$\left.\frac{\partial t_{total}}{\partial T}\right|_{T=T_o} = \left.\frac{\partial}{\partial T}\left(\frac{2NK}{K_\mu} \frac{V_{out} T^{\frac{3}{2}}}{(V_{out} - \alpha T - V_T(T_0) + \alpha T_0)^2}\right)\right|_{T=T_o} = 0. \quad (5)$$

$$V_{dd\_opt} = \frac{4}{3}\alpha T_o + V_{To}. \quad (6)$$

Here, $V_{dd\_opt}$ is the boundary supply voltage, at which the delay of the circuit is temperature-independent.

EXAMPLE 2

Tests Performed to Determine Whether Performance Losses Caused by Thermal Effects in an IC were Recoverable Tests were performed to determine whether performance losses caused by thermal effects in an IC were recoverable using the prototype described in Example 1. When $V_{out}$ was greater than $V_{dd\_opt}$ in Eq. 6, thermal effects in the mobility µ dominated the delay time $T_{total}$, and the effect of the threshold voltage $V_T$ was insignificant. As such, the propagation delay $t_d$ of each inverter stage had a positive temperature dependence. When $V_{out}$ was less than $V_{dd\_opt}$ in Eq. 6, the propagation delay $t_d$ of each inverter stage had a negative temperature dependence because the effects of the threshold voltage $V_T$ dominated $T_{total}$. Thus, performance losses caused by thermal effects in the IC were recovered by adjusting the $V_{out}$ using the delay-line-based digital controller. See K. Kanda, et al., "Design Impact of Positive Temperature Dependence on Drain Current in Sub-1-V CMOS VLSIS," IEEE J. Solid-State Circuits, vol. 36, pp. 1559-1564 (2001).

FIGS. 2A and 2B are graphs plotting the operational timing of one embodiment of the delay line-based temperature adaptive DC-to-DC converter as a function of velocity. When the operation temperature of the IC was fixed, a reference clock (first input delay cell), as shown in FIG. 1, passed along the delay-line, and was sampled by the D flip-flop at the output of the $n^{th}$ delay cell stage after a fixed time, $T_n$. The sampled value was used by the D flip-flop as an error signal to control the on ('1') and off ('0') stages of power transistors $M_p$ and $M_n$, which operated as switches to charge and discharge the inductor in the power stage circuitry. When the traveling time (the delay) of the reference clock from the first stage to the last stage of the delay line was increased, the D flip-flop sampled a value '1' at the end of the delay line as shown in FIG. 2A. The output of the $n^{th}$ inverter stage maintained an initial value of "1" to charge the inductor in the power stage circuit and to increase $V_{out}$. When $V_{out}$ increased beyond the steady-state value established by Eq. 4, the delay-line responded by decreasing $t_{delay}$ and the D flip-flop sampled a value '0' as shown in FIG. 2B. The output of the $n^{th}$ stages then changed to a value of "low" to discharge the inductor in power stage circuit and decrease $V_{out}$. At a fixed temperature, $V_{out}$ remained at a constant value with small fluctuations (<5% $V_{out}$). When the operation temperature of the IC varied, $V_{out}$ of the DC-to-DC converter was adjusted to compensate for any thermal effects on the delay-line. (The operating temperature affects the delay of the delay-line based on Eq. 4. When temperature varies, to keep the delay constant, the DC-to-DC converter adjusts $V_{out}$, as shown in Eq. 4.)

FIG. 3 shows a graph plotting the operational timing of one embodiment of the delay line-based temperature adaptive DC-to-DC converter as a function of temperature, with a $V_{out}$ ranging from 1.7 to 2.5 V. The time delay of the circuits, as shown in FIG. 3, was positively temperature dependent—that is, the time delay increased as the temperature increased. The output of the $n^{th}$ stages changed to a value of "high" after time $T_n$ to charge the inductor in the power stage circuit and increase $V_{out}$. When $V_{out}$ was less than $V_{dd\_opt}$ in Eq. 6, the delay-line showed a negative temperature dependence—that is, the time delay decreased as the temperature decreased. A higher temperature caused a shorter delay and discharged the inductor because $V_{th}$ (threshold voltage) of the transistor in the power stage, as shown in FIG. 1, controlled the gate delay ($t_d$ in Eq. 1.). Finally, the variation of $V_{out}$ eliminated any variation in temperature.

EXAMPLE 3

Thermal Compensation in a Ring Oscillator

A ring oscillator is an important component of a clock generating circuit. Maintaining a constant frequency in a ring oscillator is important because drift in an oscillating frequency increases jitter. Ideally, the spacing between transitions in an oscillator is constant. In practice, however, the transition spacing is a variable. This uncertainty is known as clock jitter, or phase noise. Jitter is the result of the effective sampling time changing from one sampling instance to the next, and is more pronounced for high-speed signals. More specifically, when high-speed signals are being sampled, the input signal changes rapidly, resulting in small amounts of aperture uncertainty, which causes the held voltage to be significantly different from the ideal held voltage, and induces instability in clock generating circuits. The delay line and ring oscillator are the most representative circuits of pipeline data-paths and sequential logics, respectively.

The frequency of a ring oscillator is expressed as $$f_{ring} = \frac{1}{2n't_d'} \quad (7)$$

$$t_d' = \frac{KV_{DD}}{\mu(V_{DD} - V_{th})^2} \quad (8)$$

where n' is the number of inverters in the ring oscillator; and $t_d'$ is the propagation delay of each inverter in the ring oscillator. As reflected in Eqs. (1) and (7), CMOS ring oscillators and CMOS delay lines have similar thermal behavior patterns. Thus, the CMOS delay line was a suitable temperature detector for compensating thermal effects in a CMOS ring oscillator. When the temperature in the circuit changed, output voltage of the DC-to-DC converter was adjusted to inhibit the occurrence of delay variations in each inverter. Finally, the falling edge of the reference clock— that is, the edge of the clock—that is, the square waveform as shown in FIGS. 2A, 2B, 3A and 3B, fluctuated from "1" (high) to "0" (low). The output voltage $V_{out}$ in FIG. 1 was used as a supply voltage for the ring oscillator so that the supply voltage could be varied to compensate for delay variations in each inverter.

Figure 4:
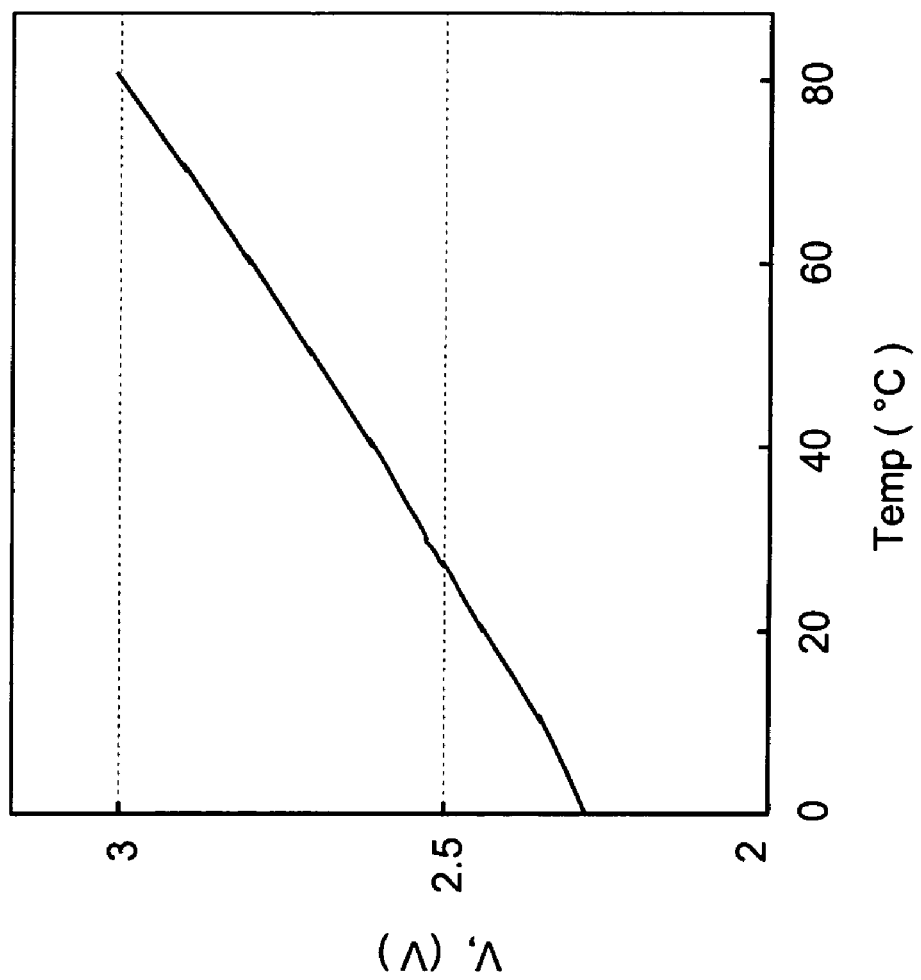
FIG. 4 is a graph plotting the adaptive output voltage of one embodiment of the delay line-based temperature adaptive DC-to-DC converter as a function of temperature.

FIG. 4 is a graph plotting the $V_{out}$ of one embodiment of the delay-line based temperature adaptive DC-to-DC converter as a function of temperature. At room temperature and an output voltage of 2.5 V, the average temperature coefficient of the converter was 9 mV/degree, the input voltage of the DC-to-DC converter ("$V_g$") was 3.3 V, and the output voltage ripple was below 25 mV, as shown in FIG. 4. The inductor and capacitor of the DC-to-DC converter were 4.7 μH and 10 μF, respectively, and had an equivalent loading resistance of 50 ohm. The power efficiency was approximately 90 percent.

Figure 5:
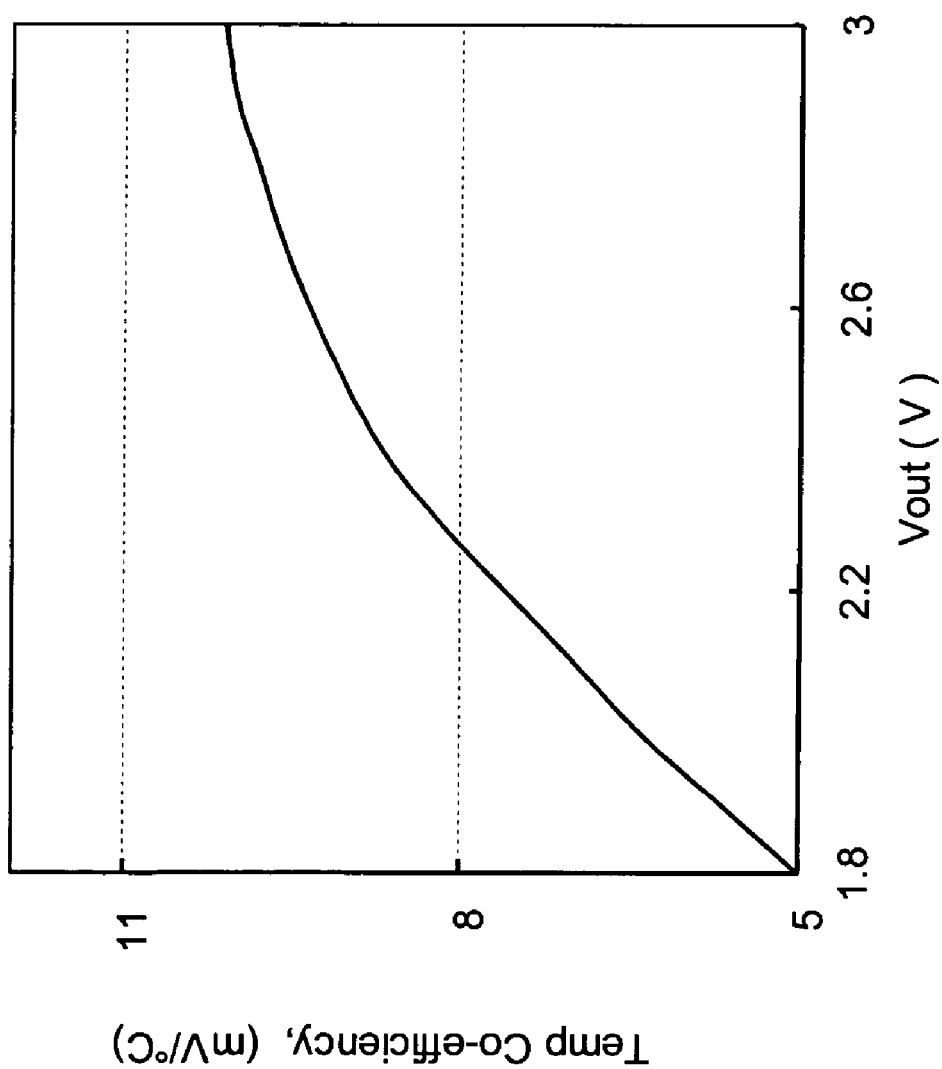
FIG. 5 is a graph plotting the temperature coefficient of one embodiment of the delay-line based temperature adaptive DC-to-DC converter as a function of output voltage.

FIG. 5 is a graph plotting the temperature coefficient of one embodiment of the delay-line based temperature adaptive DC-to-DC converter as a function of output voltage. The temperature coefficient of the converter, as shown in FIG. 5, decreased as the output voltage decreased, and the temperature coefficient of the converter increased as the output voltage increased.

Figure 6:
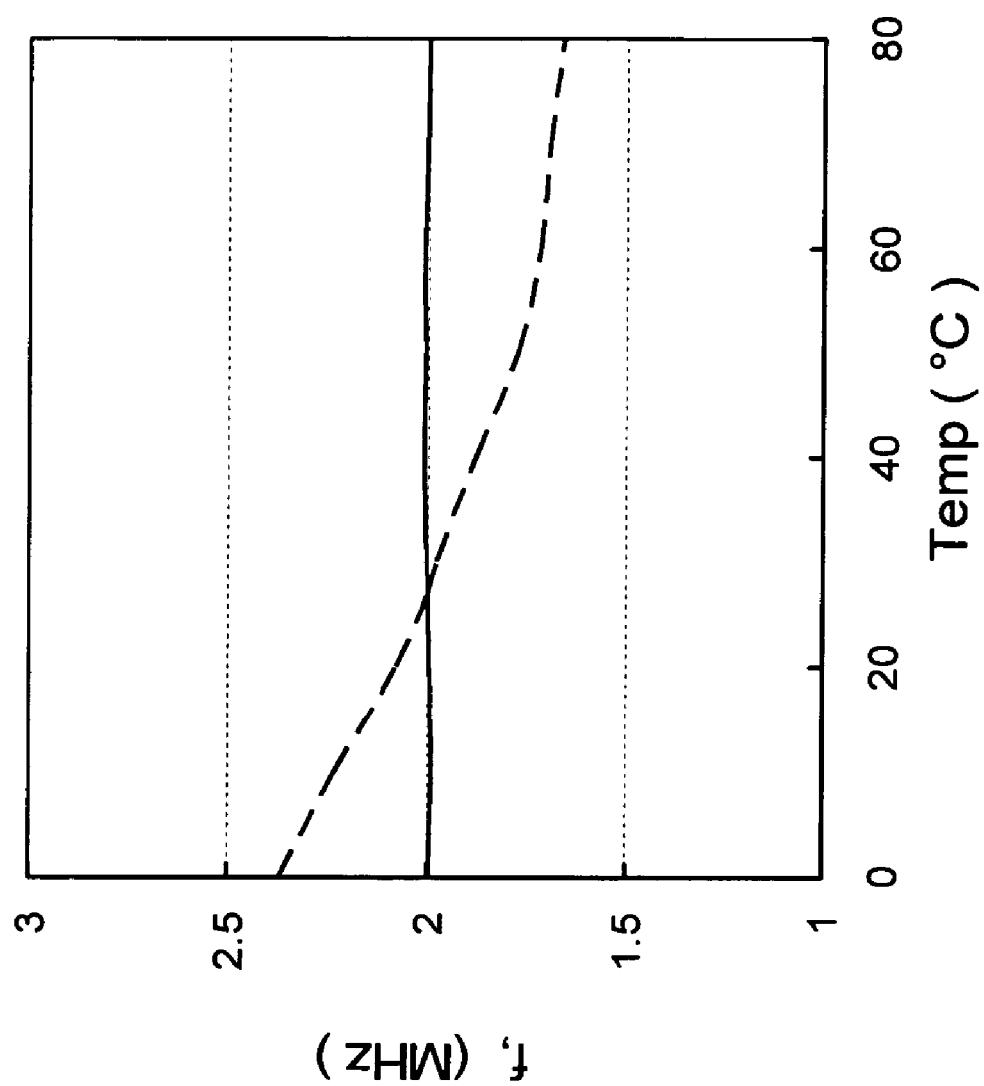
FIG. 6 is a graph plotting the frequency variation of one embodiment of the testing ring oscillator as a function of temperature.

FIG. 6 is a graph plotting the frequency variation of one embodiment of the testing ring oscillator as a function of temperature. (The solid and dashed lines represent the frequency of ring oscillator with and without thermal compensation, respectively.) As shown in FIG. 6, the frequency variation was 9 kHz/degree (4046 ppm/degree) without thermal compensation (illustrated by a dashed line), and was reduced to 0.15 kHz/degree (74 ppm/degree) with thermal compensation (illustrated by a solid line). The results show that temperature dependence of the ring oscillator was significantly reduced using temperature adaptive supply voltage. (These results will also apply to other ring oscillators having different oscillating frequencies.)

Figure 7:
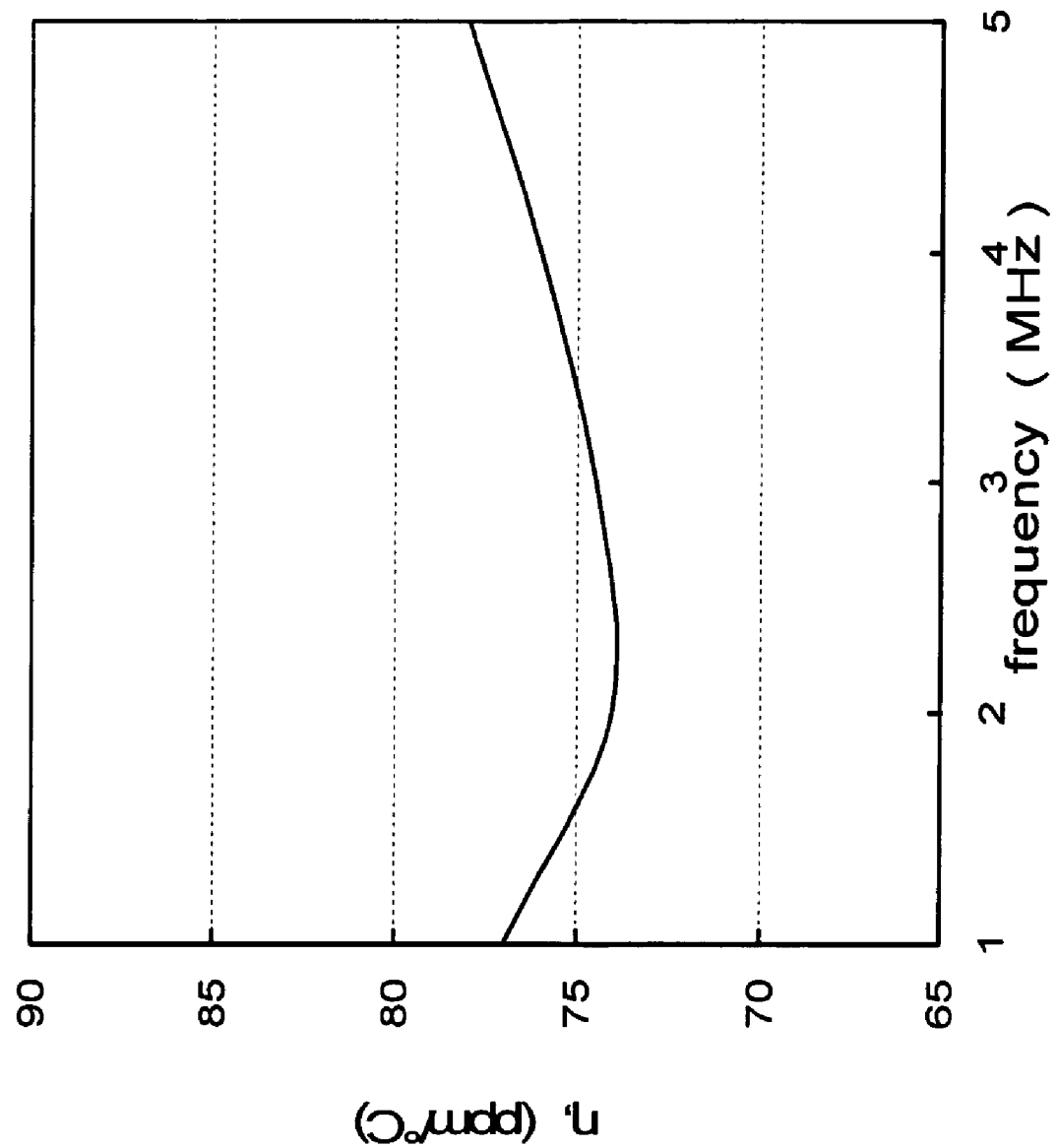
FIG. 7 is a graph plotting the average temperature coefficient of one embodiment of different testing ring oscillators as a function of oscillating frequencies.

FIG. 7 is a graph plotting the average temperature coefficient of various testing ring oscillators as a function of oscillating frequencies. The solid and dash lines represent the frequency of the ring oscillator with and without thermal compensation, respectively. Testing ring oscillators (not shown) were used to evaluate the thermal compensation of the DC-to-DC converter. The results showed that when the number of inverters in the ring oscillator was similar to that of delay-line, thermal compensation was improved. The temperature coefficients of the oscillating frequencies were reduced by 54 times (from 4046 ppm/degree to 74 ppm/degree).

Figure 8:
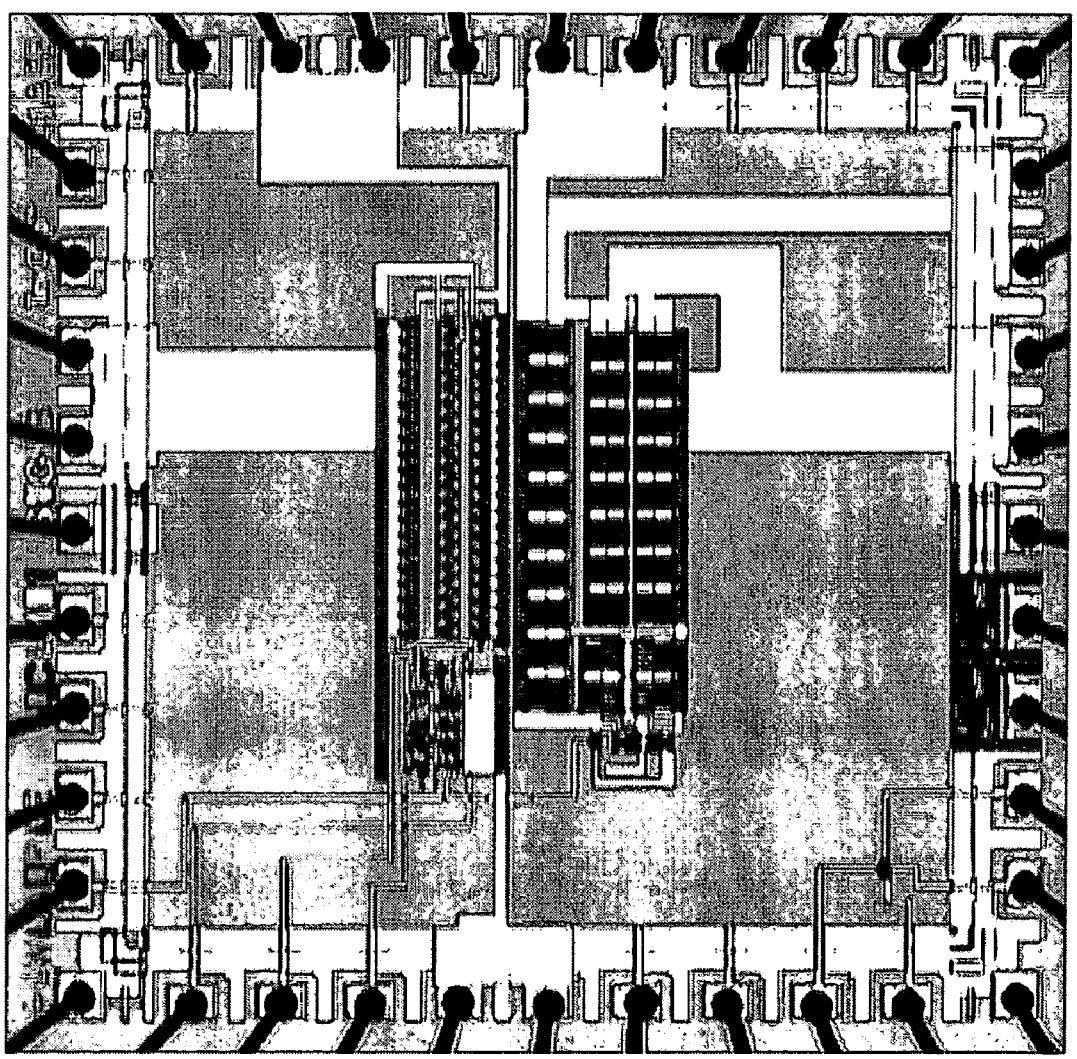
FIG. 8 is an optical micrograph of one embodiment of the temperature adaptive DC-to-DC converter.

FIG. 8 is a micrograph of one embodiment of the temperature adaptive DC-to-DC converter. The compact delay-line based digital controller allowed for the design of a chip having a size of about 1 mm$^2$ in a standard 1.5 μm CMOS process. (This dimension represents the minimum length of the CMOS transistor, which was used as a standard to differentiate various fabrication processes.)

From the above tests, the following conclusions could be made. The use of the temperature adaptive DC-to-DC converter enhanced the reliability and performance of the IC by minimizing performance degradation caused by abnormal temperature variations in the circuit, by minimizing processing errors and operating failures. The power consumption of the delay-line based digital controller was less than 0.1 mW, which is much lower than traditional controllers. The power efficiency was 90 percent at an output power of 125 mW. Frequency variation was reduced from 4046 to 74 ppm/degree. The converter also improved frequency stability of ring oscillators in the IC over a wide temperature range, and minimized the space required for on-chip temperature compensation.

The complete disclosures of all references cited in this specification are hereby incorporated by reference. Also incorporated by reference is the following preprint of a paper written by the inventors, a preprint that is attached to and made a part of this specification: C. Zhang and D. Ma, "Thermal compensation method for CMOS digital integrated circuits using temperature-adaptive DC/DC converter," (preprint, submitted to IEEE Trans. on Circuits & Systems II, on Jul. 1, 2005). In the event of an otherwise irreconcilable conflict, however, the present specification shall control.

We claim:
1. An integrated circuit comprising:
   (a) a temperature-adaptive digital DC-to-DC voltage converter comprising a power stage with one or more power switches, one or more inductors, and one or more capacitors;
   (b) a delay-line based digital controller comprising a temperature sensing circuit, a clock generator, and a pulse-width modulator; wherein said temperature sensing circuit comprises a plurality n of delay cells for creating a propagation delay in response to temperature changes in said integrated circuit; wherein said clock generator is adapted to generate a reference clock signal; and wherein said pulse-width modulator is connected to said output power supply to detect abnormal voltage changes in said integrated circuit and to generate an error signal for operating the power stage in an on-state or off-state condition;
   wherein:
   (c) when the temperature in said integrated circuit is normal, said integrated circuit performs normal operations without any interference from said delay-line based digital controller; when the output of the propagation delay is greater than about the output of said reference clock, said delay-line based digital controller signals said pulse-width modulator to increase the output voltage supplied to said integrated circuit by switching on at least one of said one or more power switches to charge at least one of said one or more inductors to deliver the stored charge to at least one of said one or more capacitors; wherein as the charge of at least one of said one or more capacitors increases, output voltage increases to increase the output of said power stage and thus to decrease the output of the propagation delay; and wherein if the output of the propagation delay is less than about the output of said reference clock, said delay-line based digital signals said pulse-width modulator to decrease the output voltage supplied to said integrated circuit by switching on at least one of said one or more power transistors to charge at least one of said one or more capacitors with less inductor current; wherein as the charge of at least one of said one or more capacitors decreases, output voltage decreases to increase the propagation delay.

2. An integrated circuit as recited in claim 1, wherein said one or more power switches are selected from the group consisting of power transistors and power diodes.

3. An integrated circuit as recited in claim 1, wherein said integrated circuit is selected from the group consisting of complementary metal-oxide semiconductor, metal-oxide semiconductor, bipolar complementary metal-oxide semiconductor, analog, mixed-signal, and digital integrated circuits.

4. An integrated circuit as recited in claim 1, wherein said pulse-width modulator comprises a circuit of error signal generation.

5. An integrated circuit as recited in claim 1, wherein said pulse-width modulator circuit is a D flip-flop.

6. An integrated circuit as recited in claim 1, wherein the resolution of said output voltage is adapted by adapting the number of plurality n of said delay cells and the propagation delay of each delay cell.

7. An integrated circuit as recited in claim 1, wherein the plurality n of said delay cells is 20.

8. An integrated circuit as recited in claim 1, wherein said integrated circuit is a 1.5 μm double-poly, double-metal CMOS N-well process.

9. An integrated circuit as recited in claim 1, wherein the resolution of said output voltage is 25 mV.

10. An integrated circuit as recited in claim 1, wherein the active die area of said integrated circuit is about 1 $mm^2$.

11. An integrated circuit as recited in claim 1, wherein the power consumption of said delay-line based digital controller is less than about 0.1 mW.

12. An integrated circuit as recited in claim 1, wherein the power efficiency of said integrated circuit is about 90 percent at an output power of about 125 mW.

13. An integrated circuit as recited in claim 1, wherein the plurality n of said delay cells is adapted to control the sensitivity level of said delay-line based digital controller.

14. A method for adjusting one or more of the following: frequency, temperature, supply voltage or operation speed of an integrated circuit, comprising a digital voltage control system having a temperature-adaptive digital DC-to-DC voltage converter comprising a power stage with one or more power switches, one or more inductors, one or more capacitors, and a delay-line-based digital controller comprising a plurality n of delay cells for creating a propagation delay in response to temperature changes in the integrated circuit, a pulse-width modulator for operating the power stage in an on-state or off-state condition, and a reference clock, wherein the output of the power stage is connected to the delay-line-based digital controller; the method comprising the steps of:

(a) monitoring voltage levels in the integrated circuit, using the delay-line-based digital controller;
(b) monitoring propagation delays in the integrated circuit, using the delay-line-based digital controller;
(c) comparing the propagation delay to the reference clock to produce an error signal; and
(d) monitoring the error signal to detect increases and decreases in the propagation delay using the pulse-width modulator;

wherein:
(e) when the temperature in the integrated circuit is normal, the integrated circuit performs normal operations without any interference from the delay-line based digital controller; when the output of the propagation delay is greater than about the output of the reference clock, the delay-line based digital controller signals the pulse-width modulator to increase the output voltage supplied to the integrated circuit by switching on at least one of the one or more power switches to charge at least one of the one or more inductors to deliver the stored charge to at least one of the one or more capacitors; wherein as the charge of at least one of the one or more capacitors increases, output voltage increases to increase the output of the power stage and thus to decrease the output of the propagation delay; and wherein if the output of the propagation delay is less than about the output of the reference clock, the delay-line based digital signals the pulse-width modulator to decrease the output voltage supplied to the integrated circuit by switching on at least one of the one or more power transistors to charge at least one of the one or more capacitors with less inductor current; wherein as the charge of the one or more capacitors decreases, output voltage decreases to increase the propagation delay.

15. A method as recited in claim 14, wherein the one or more power switches are selected from the group consisting of power transistors and power diodes.

16. A method as recited in claim 14, wherein the integrated circuit is selected from the group consisting of complementary metal-oxide semiconductor, metal-oxide semiconductor, bipolar complementary metal-oxide semiconductor, analog, mixed-signal, and digital integrated circuits.

17. A method as recited in claim 14, wherein the pulse-width modulator comprises a circuit of error signal generation.

18. A method as recited in claim 14, wherein the pulse-width modulator circuit is a D flip-flop.

19. A method as recited in claim 14, wherein the resolution of the output voltage is adapted by adapting the number of plurality n of the delay cells and the propagation delay of each delay cell.

20. A method as recited in claim 14, wherein the plurality n of the delay cells is 20.

21. A method as recited in claim 14, wherein the integrated circuit is a 1.5 μm double-poly, double-metal CMOS N-well process.

22. A method as recited in claim 14, wherein the resolution of the output voltage is 25 mV.

23. A method as recited in claim 14, wherein the active die area of the integrated circuit is about 1 $mm^2$.

24. A method as recited in claim 14, wherein the power consumption of the delay-line based digital controller is less than about 0.1 mW.

25. A method as recited in claim 14, wherein the power efficiency of the integrated circuit is about 90 percent at an output power of about 125 mW.

26. A method as recited in claim 14, wherein the plurality n of the delay cells is adapted to control the sensitivity level of the delay-line based digital controller.

* * * * *